United States Patent
Maksimov et al.

(10) Patent No.: US 12,510,679 B1
(45) Date of Patent: Dec. 30, 2025

(54) HIGH THERMAL CONDUCTIVITY SCINTILLATORS FOR IMAGING

(71) Applicant: Radiation Monitoring Devices, Inc., Watertown, MA (US)

(72) Inventors: Oleg Maksimov, Shrewsbury, MA (US); Harish B. Bhandari, Brookline, MA (US); Vivek V. Nagarkar, Weston, MA (US)

(73) Assignee: Radiation Monitoring Devices, Inc., Watertown, MA (US)

( * ) Notice: Subject to any disclaimer, the term of this patent is extended or adjusted under 35 U.S.C. 154(b) by 275 days.

(21) Appl. No.: 18/215,307

(22) Filed: Jun. 28, 2023

Related U.S. Application Data

(60) Provisional application No. 63/357,124, filed on Jun. 30, 2022.

(51) Int. Cl.
*G01T 1/20* (2006.01)
*C09K 11/77* (2006.01)

(52) U.S. Cl.
CPC ...... *G01T 1/20181* (2020.05); *C09K 11/7701* (2013.01); *C09K 11/7706* (2013.01); *C09K 11/7774* (2013.01)

(58) Field of Classification Search
CPC ............ C09K 11/7701; C09K 11/7706; C09K 11/7774; G01T 1/20181
See application file for complete search history.

(56) References Cited

U.S. PATENT DOCUMENTS

| 5,882,547 A | 3/1999 | Lynch et al. |
| 2010/0090111 A1* | 4/2010 | Stoller .................... G01V 5/10 |
| | | 250/362 |
| 2022/0102229 A1* | 3/2022 | Ichikawa ............ H01L 23/3732 |

FOREIGN PATENT DOCUMENTS

| EP | 1958269 B1 | 9/2019 | |
| WO | WO-2020125685 A1 * | 6/2020 | ........... G01T 1/2002 |

OTHER PUBLICATIONS

English translation of WO 2020/125685 A1 (Year: 2020).*
Wei Zheng, Lemin Jia, and Feng Huang, Vacuum-Ultraviolet Photon Detections, iScience 23, 101145, Jun. 26, 2020.
Takayuki Yanagida, Hiroyuki Takahashi, Teruaki Enoto, and Motoyuki Sato, Evaluation of Properties of YAG (Ce) Ceramic Scintillators, IEEE Transactions on Nuclear Science, vol. 52, No. 5, Oct. 2005.
Evan Mitsoulis and John Vlachopoulos, The Finite Element Method for Flow and Heat Transfer, Advances in Polymer Technology, Jun. 1984.
Ziyu Lin, Shichao Lv, Zhongmin Yang, Jianrong Qiu, and Shifeng Zhou, Structured Scintillators for Efficient Radiation Detection, Adv. Sci. 2022, 9, 2102439.
Tomas Burian et al., Soft x-ray free-electron laser induced damage to inorganic scintillators, Optical Materials Express, vol. 5, No. 2, Feb. 1, 2015.
Rui Ma et al., Preparation and characterization of YAG:Ce thin phosphor films by pulsed laser deposition, International Journal of Applied Ceramic Technology, vol. 14, Issue 1, p. 22-30, Oct. 8, 2016.

* cited by examiner

*Primary Examiner* — Mark R Gaworecki
(74) *Attorney, Agent, or Firm* — CM Law PLLC; Orlando Lopez

(57) ABSTRACT

Scintillators that are not thermally damaged by heat generated by a predetermined radiation pulse impinging on the scintillator.

23 Claims, 5 Drawing Sheets

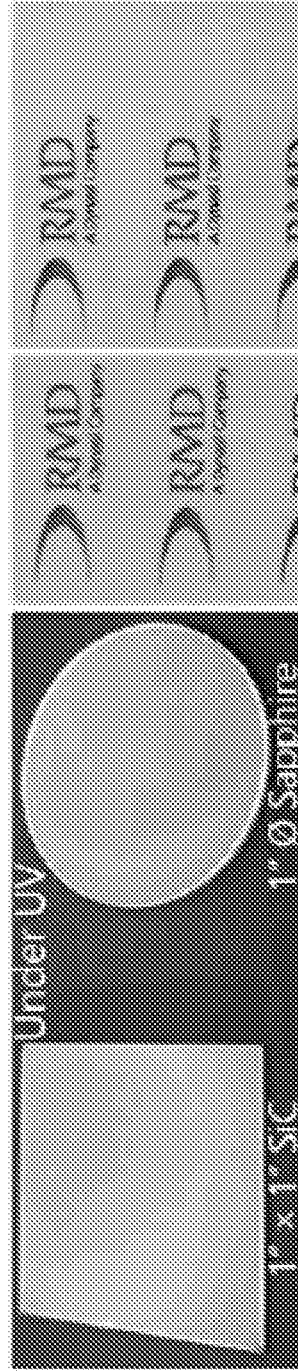
Fig. 3A  Fig. 3B  Fig. 3C  Fig. 3D  Fig. 3E

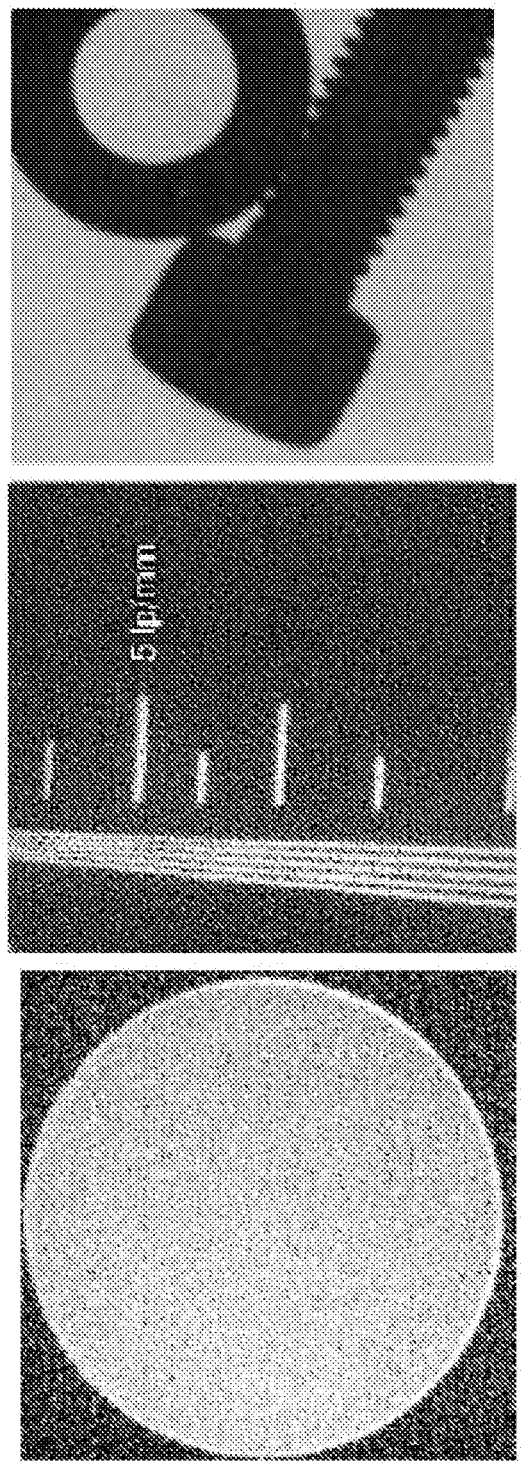

US 12,510,679 B1

HIGH THERMAL CONDUCTIVITY SCINTILLATORS FOR IMAGING

CROSS REFERENCE TO RELATED APPLICATIONS

This application claims priority of U.S. Provisional Application No. 63/357,124, entitled HIGH THERMAL CONDUCTIVITY SCINTILLATORS FOR IMAGING, filed on Jun. 30, 2022, which is incorporated by reference herein in its entirety and for all purposes.

STATEMENT REGARDING FEDERALLY SPONSORED RESEARCH OR DEVELOPMENT

This invention was made with U.S. Government support from the Department of Energy under the grant DE-SC0021542. The U.S. Government has certain rights in the invention.

BACKGROUND

These teachings relate generally to scintillators, and, more particularly, to scintillators that are not thermally damaged by heat generated by a predetermined radiation pulse impinging on the scintillator.

Cerium-doped Yttrium Aluminum Garnet (YAG:Ce) is a widely used scintillator that is currently utilized in the wavefront sensor (WFS) at the beam line. While being a very good X-ray sensor, it suffers from a poor thermal conductivity (14 $Wm^{-1} \cdot K^{-1}$). It is estimated that YAG:Ce will be damaged with less than 1% of the full power X-ray beam at 1 MHz repetition rate. Thus, scintillators that can conduct the heat away heat generated by a full power X-ray beam at 1 MHz repetition rate impinging on the scintillator, are needed.

There is a need for scintillators that are not thermally damaged by heat generated by a predetermined radiation pulse impinging on the scintillator.

BRIEF SUMMARY

Scintillators that are not thermally damaged by heat generated by a predetermined radiation pulse impinging on the scintillator are disclosed hereinbelow.

In one or more instantiation, the X-ray scintillator of these teachings includes a first layer of material with thermal conductivity greater than a predetermined thermal conductivity, and a layer of scintillator material deposited on the first layer, a thickness of the first layer being obtained from estimation of temperature distribution formed by a predetermined radiation pulse or pulses impinging on a layer of scintillator material most distant from the first layer, the predetermined thermal conductivity being selected from the estimation of temperature such as to obtain predetermined results. The predetermined results include thermal conduction that prevents thermal damage of the scintillator.

In one instance, the predetermined thermal conductivity is between about 140 $Wm^{-1}K^{-1}$ and about 180 $Wm^{-1}K^{-1}$.

In one or more other instantiation, the scintillator of these teachings includes a number of stack components, each stack component from the number of stacked components including a layer of material with thermal conductivity greater than a predetermined thermal conductivity, and a layer of scintillator material deposited on said layer. Each stacked component, starting with the second stacked component, is vacuum deposited on a preceding stacked component. A thickness of each layer of material is obtained from the estimation of temperature distribution formed by a predetermined radiation pulse or pulses impinging on a layer of X-ray scintillator material most distant from a layer of material in a first stacked component from the number of stacked components, the predetermined thermal conductivity being selected from the estimation of temperature such as to obtain predetermined results. The predetermined results include thermal conduction that prevents thermal damage of the scintillator.

In one or more instantiation, the method of these teachings for preventing thermal damage of a scintillator exposed to high energy, fast timing radiation beams includes depositing a layer of scintillator material on a first layer of a material with thermal conductivity greater than a predetermined thermal conductivity, and selecting a thickness of said first layer from estimation of temperature distribution formed by a predetermined radiation pulse impinging on a layer of Scintillator material most distant from said first layer; the predetermined thermal conductivity being selected from the estimation of temperature such as to prevent thermal damage of the scintillator. Thermal conduction into the first layer prevents thermal damage of the scintillator.

In one instance, the predetermined radiation pulse or pulses includes an X-ray beam of energy between about 250 ev to about 18 Kev and a repetition rate of up to about 1 Mhz. Other instantiations are disclosed hereinbelow.

For a better understanding of the present teachings, together with other and further objects thereof, reference is made to the accompanying drawings and detailed description and its scope will be pointed out in the appended claims.

BRIEF DESCRIPTION OF THE DRAWINGS

FIGS. 3A and 3B show images of illustrative instantiations of an x-ray scintillator material vacuum deposited on two different substrates;

FIGS. 3C-3E show evidence of high level of transparency of the x-ray scintillators of FIGS. 3A and 3B;

FIG. 4A is pictorial representation of a flood field X-ray image from detailed instantiation of an x-ray scintillator material vacuum deposited on $Al_2O_3$;

FIGS. 4B and 4C show images obtained with the detailed instantiation of an x-ray scintillator used in FIG. 4A; and, FIG. 5A-5C show average images of a test phantom from a reference scintillator (A) and two vacuum deposited x-ray scintillators on different substrates.

DETAILED DESCRIPTION

Figures 1A, 1B:
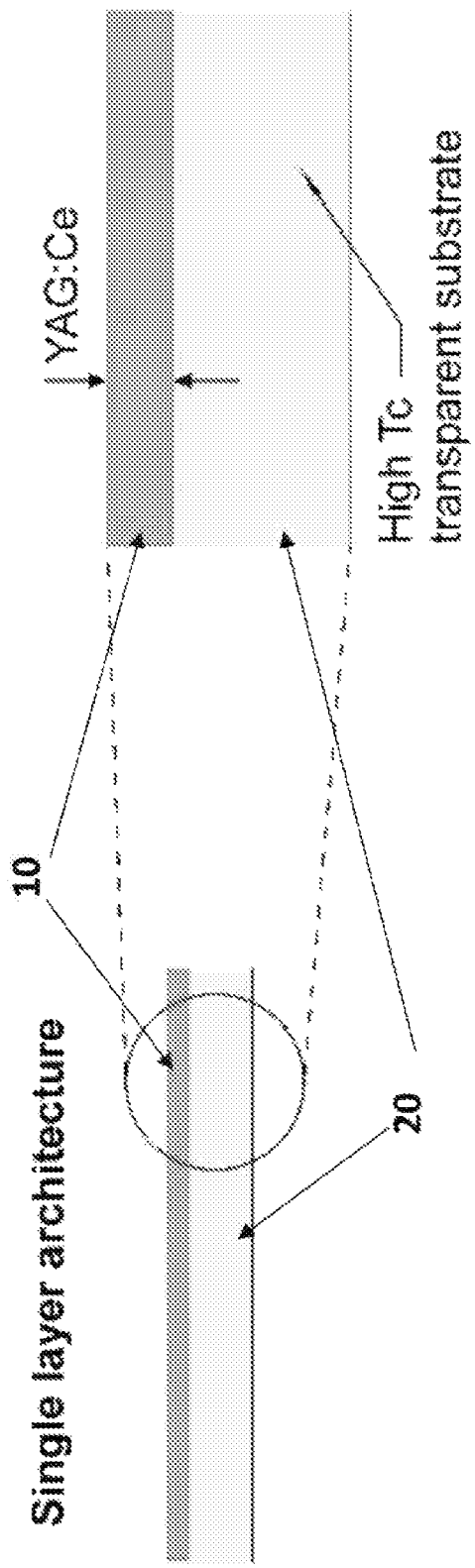
FIG. 1A is a graphical representation of one instantiation of the x-ray scintillator of these teachings.
FIG. 1B is a detail instantiation of the x-ray scintillator of FIG. 1A.

Although the invention has been described with respect to various embodiments, it should be realized these teachings are also capable of a wide variety of further and other embodiments within the spirit and scope of the appended claims.

For clear understanding of these teachings, the following definitions are provided.

"Vacuum deposited," as used herein, refers to deposition by sputtering or vapor deposition (including different ways to obtain the vapor such as, for example, pulsed laser deposition and e-beam deposition).

Deposition, as used herein, includes vacuum deposition and intercalation (see, for example, Manthila Rajapakse et al., Intercalation as a versatile tool for fabrication, property tuning, and phase transitions in 2D materials, npj 2D Materials and Applications (2021) 5:30, which is incorporated herein by reference in its entirety and for all purposes). Deposited refers to obtained by deposition.

As used herein, the finite element method (FEM) is a numerical analysis technique for obtaining approximate solutions to engineering problems such as heat conduction. Other analytical techniques (such as, for example, the Boundary element method and the finite difference method) are within the scope of these teachings.

Scintillator Requirements

Image quality, specifically uniformity and resolution, is paramount for accurate wavefront sensing and focal spot reconstruction. Sufficient image quality has been demonstrated with YAG:Ce. The scintillator of these teachings matches the image quality of YAG:Ce while providing high thermal conductivity. In one instance, LCLS-II Talbot gratings can be fabricated from CVD diamond in order to withstand the large heat load of the high rate FEL. These gratings will absorb most of the beam (90-99%) and transmit 1-10% of the FEL power to the scintillator (see Burian, T., et. al. (2015). Opt. Mater. Expr. 5, 254). This results in a ~1-10 W incident beam power on the beam imaging scintillator depending on the operating mode. As such, the thermal requirement of the scintillator is to withstand 5 W of average beam power (~1-10 mm FWHM beam size) with a goal of 10 W tolerance.

Also, practical implementation of the wavefront sensor at either an XFEL or synchrotron facility requires coverage over a wide range of energies from 250 eV to 18 keV. Higher depth of penetration of hard X-rays (18 keV, for example) precludes the use of bulk scintillators, which degrade spatial resolution due to light spread. Thus, a thin film scintillator that performs as good as YAG, provides the desired high thermal conductivity greater than 200 $Wm^{-1}\cdot K^{-1}$, and provides the anticipated very good scintillation performance over a wide energy range is desired. The scintillator of these teachings meets these requirements.

In one or more other instantiation, the scintillator of these teachings includes a first layer of material with thermal conductivity greater than a predetermined thermal conductivity, and a layer of scintillator material deposited on the first layer, a thickness of the first layer being obtained from estimation of temperature distribution formed by a predetermined radiation pulse or pulses impinging on a layer of scintillator material most distant from the first layer, the predetermined thermal conductivity being selected from the estimation of temperature such as to obtain predetermined results. The predetermined results include thermal conduction that prevents thermal damage of the scintillator.

In one instance, the predetermined thermal conductivity is between about 140 $Wm^{-1}K^{-1}$ and about 180 $Wm^{-1}K^{-1}$.

In one instance, the estimation of temperature distribution is performed via finite element analysis.

In one instance, the first layer is vacuum deposited on a substrate.

In some instantiations, the vacuum deposition is sputtering.

FIG. 1A shows a first layer of material 20 with thermal conductivity greater than a predetermined thermal conductivity (for instance, 180 $Wm^{-1}K^{-1}$), and a layer of scintillator material 10 vacuum deposited on the first layer 20, In one instance, the layer of scintillator material 10 is 1 to 5 μm thick. FIG. 1B shows a detailed instantiation where the layer of scintillator material 10 is Cerium doped Yttrium aluminum garnet (YAG, $Y_3Al_5O_{12}$) (referred to as YAG:Ce). The first layer of material 20 with thermal conductivity greater than 180 $Wm^{-1}K^{-1}$ can be, in one instantiation, one of SiC, AlN or BeO.

In one instance, the layer of scintillator material 10 is a thin, 1 to 5 micrometers thick layer of scintillator material.

The detailed instantiation shown in FIG. 1B is particularly useful for soft X-rays that have limited penetration in YAG:Ce.

In one or more other instantiation, the scintillator of these teachings includes a number of stack components, each stack component from the number of stacked components including a layer of material with thermal conductivity greater than a predetermined thermal conductivity, and a layer of scintillator material deposited on said layer. Each stacked component, starting with the second stacked component, is vacuum deposited on a preceding stacked component. A thickness of each layer of material is obtained from the estimation of temperature distribution formed by a predetermined radiation pulse or pulses impinging on a layer of X-ray scintillator material most distant from a layer of material in a first stacked component from the number of stacked components, the predetermined thermal conductivity being selected from the estimation of temperature such as to obtain predetermined results. The predetermined results include thermal conduction that prevents thermal damage of the scintillator.

In one instance, the predetermined thermal conductivity is between about 140 $Wm^{-1}K^{-1}$ and about 180 $W^{m-1}K^{-1}$.

In one instance, the estimation of temperature distribution is performed via finite element analysis.

In one instance, each layer of material is vacuum deposited on a substrate.

In some instantiations, the vacuum deposition is sputtering.

Figures 2A, 2B:
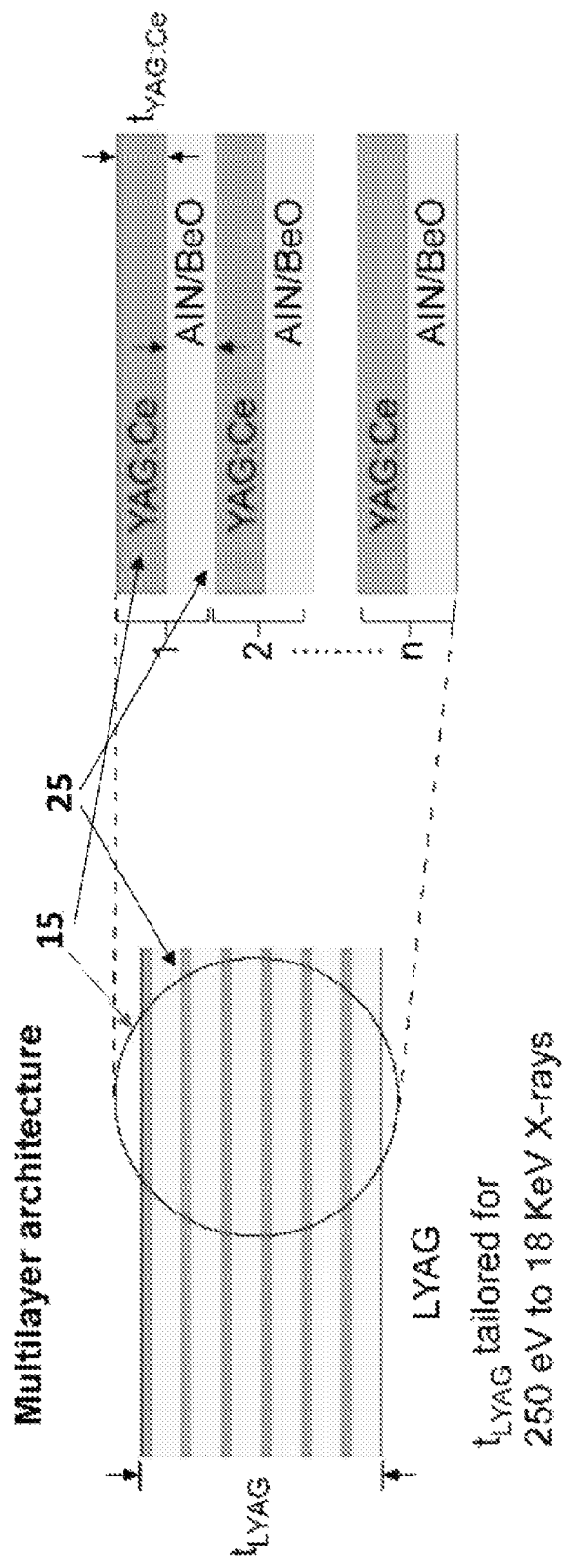
FIG. 2A is a graphical representation of another instantiation of the x-ray scintillator of these teachings.
FIG. 2B is a detail instantiation of the x-ray scintillator of FIG. 2A.

FIG. 2A shows a scintillator of these teachings having a number of stack components. Each stacked component including a layer of material 25, the material having thermal conductivity greater than a predetermined thermal conductivity (for instance, 180 $Wm^{-1}K^{-1}$), and a layer of scintillator material 15 vacuum deposited on the layer of material 25. A thickness of each layer of material is obtained from estimation of temperature distribution formed by a predetermined radiation pulse or pulses impinging on a layer of scintillator material most distant from a layer of material in a first stacked component from the number of stacked components.

FIG. 2B shows detailed instantiation where the layer of scintillator material 15 is Cerium doped Yttrium aluminum garnet (YAG, $Y_3Al_5O_{12}$) (referred to as YAG:Ce). The layer of material 20 with thermal conductivity greater than a predetermined thermal conductivity (for instance, 180 $Wm^{-1}K^{-1}$) can be, in one instantiation, one of SiC, AlN or BeO.

In the structure shown in FIGS. 2A and 2B, the structures can be grown as alternating layers of vacuum deposited scintillator material 15 and material of high thermal conductivity 25. The two candidate materials shown in FIG. 2B, Aluminum Nitride (AlN) and Beryllium Oxide (BeO), have bulk thermal conductivities of 285 $Wm^{-1}\cdot K^{-1}$ and 325 $Wm^{-1}K^{-1}$, respectively. The multilayers can be made to be substantially transparent materials, using, for example, deposition methods such as confocal RF Sputtering.

In all installations, the material of the layer of material with thermal conductivity greater than a predetermined thermal conductivity (for instance, 180 Wm$^{-1}$K$^{-1}$) is substantially transparent in the frequency range of the scintillator emission.

There are a number of advantages of the detailed instantiation shown in FIG. 2B. Some of those advantages are:

The multilayered stack of (BeO/YAG) n or (AlN/YAG) n will have a strong phonon coupling at multiple interfaces "n" for efficient heat dissipation, The growth of all three materials (YAG, BeO and AlN) have been demonstrated by RF sputtering independently, The spatial uniformity in scintillator performance is guaranteed for areas up to 50 mm×50 mm; 2" diameter sputter targets are used in one instance, Very good interlayer bonding is expected as the multilayers are fabricated in a single chamber without breaking vacuum.

There is very good refractive index match between YAG:Ce (1.8 @ 550 nm) with BeO (1.7) and AlN (2.2), assuring minimum scattering at the interfaces, and finally, Unlike crystalline scintillators the proposed LYAG can be tailored to preserve high resolution over the 250 eV to 18 keV range by tailoring the stack layer thicknesses.

For the detailed instantiation, as the X-ray energy is increased beyond energies that have limited penetration in YAG:Ce, the structure FIG. 1B can be replicated, as in FIG. 2B, to provide the desired absorption in the scintillator.

Some of the design parameters for the structures in the above figures include the thickness of the scintillator layer and the thickness of the layer of material with high thermal conductivity (sometimes referred to as k) and the radiation energy range in which the scintillator is used.

The finite element analysis of heat conduction includes estimation of heat load in the scintillator, which will depend on the radiation beam parameters and radiation absorption in the scintillator layer/s.

The thin film structure provides micrometer resolution as compared with the resolution in the bulk crystal scintillators.

The finite element analysis of heat conduction can be used to obtain preferred thicknesses of individual layers, which will determine the structure of the scintillator. It should be noted that, in a stacked configuration, the sicknesses of layers in one stacked can be different from the sicknesses of layers in another stacked.

Illustrative Instantiation

In order to further elucidate these teachings, an illustrative instantiation is presented herein below. It should be noted that these teachings are not limited to that illustrative instantiation.

As shown in FIG. 1B, YAG:Ce is integrated with the material of high thermal conductivity (k) in order to dissipate intense, localized heat generated by high repetition rate of X-ray beam. This can be done by growing YAG:Ce as a film directly on the SiC, which is a radiation-hard, optically transparent substrate with high thermal conductivity (300 Wm-1K-1). The direct integration of scintillator and SiC should facilitate dissipation of the intense localized heat, preventing damage of scintillator.

YAG:Ce films were deposited in the RF magneton sputtering system equipped with two 2.0" MeiVac MAK sputter deposition guns and a 3.0" sample stage substrate heater capable of operating up to 900° C. Custom-made ceramic YAG:Ce targets were used. The determination of sputtering process parameters was carried out on c-Al$_2$O$_3$ substrates, and the optimized process was then transferred onto the desired SiC substrates with high thermal conductivity.

Finite Element Analysis of Heat Dissipation in YAG:Ce SiC Heterostructure

The Finite element method was used to simulate the temperature distribution in thin layered YAG:Ce film with convective heat transfer boundary with SiC. We assumed thermal conductivity values 0.01 W mm-1C-1 and 0.3 W mm-1C-1 for YAG:Ce and SiC, respectively. The beam size and attenuation lengths for YAG:Ce and SiC for various X-ray energies used in the simulation are summarized in Table 1. Short attenuation length and low thermal conductivity of YAG results in poor thermal performance.

TABLE 1

| | FEA SIMULATIONS OF YAG:CE ON SIC | | | | |
|---|---|---|---|---|---|
| $E_{Ph}$ | 250 eV | 0.5 KeV | 1 KeV | 1.5 KeV | 2.0 KeV |
| Beam Size (FWHM) | 4.52 mm | 2.31 mm | 1.32 mm | 0.99 mm | 0.76 mm |
| YAG Atte. Length | 0.1 μm | 0.2 μm | 0.6 μm | 1.8 μm | 2.1 μm |
| SiC Atte. Length | 0.1 μm | 0.3 μm | 1.7 μm | 5.3 μm | 15 μm |
| ° C. Rise: YAG on SiC | 33.3 | 42.6 | 34.8 | 37.7 | 42.3 |
| ° C. Rise: SiC only | 21.2 | 26.3 | 32.0 | 35.9 | 39.4 |
| Tolerable Power Level | 570 W | 450 W | 550 W | 500 W | 450 W |

Simulations assumed 25 mm×25 mm×1 µm YAG:Ce on 25 mm×25 mm×330 µm SiC. Due to symmetries involved, only ¼ model was simulated. The total power of 10 W was assumed to be incident on the scintillator. The scintillator temperature rise was expected to be proportional to the total power at specific photon energy due to constant thermal conductivities.

The simulation results and temperature rise for a total power of 10 W are given in Table 1. This table also lists tolerable power levels for the YAG:Ce at SiC for various photon energies. (These are calculated using the YAG melting point of 1904° C.) The data shows that the heterostructure is well suited for energies between 250 eV and 2 keV, which is the photon energy range of soft x-ray beamlines, as the tolerable power level is well above some of the anticipated power levels on the sensor.

Sputter Deposition of YAG:Ce Films

Growth rate was evaluated as a function of RF power applied to the target, source-to-substrate distance, and substrate temperature. Results indicate that, as the source-to-substrate distance and temperature is kept constant, the growth rate increases linearly as the RF power is increased. The growth rate decreases as a square root of the distance between the target and the substrate at constant power and temperature. The growth rate also decreases as the substrate temperature is raised from 200 to 600° C. with a fixed physical separation of 5 cm and RF power of 5 W/cm$^2$.

From observations of results from this illustrative instantiation, high RF power is necessary for congruent deposition of the YAG:Ce layers with good crystal structure but too much power can cause "spitting" of the target and surface damage to the substrate.

As the source-to-substrate distance is increased, the growth rate decreases; however, it improves the film thickness uniformity over large areas. This is attributed to the scattering of the sputtered species in Ar before landing on the substrate.

The decrease in the growth rate with increasing substrate temperature is attributed to the lower sticking co-efficient at high temperatures. However, high growth temperature is critical for the activation of Ce$^{3+}$ dopant in the YAG lattice for scintillation and achieving film transparency for imaging.

The YAG:Ce films were grown at 5 W/Cm$^2$ RF power and with a source-substrate distance of 5 cm. This yielded the films that were not only transparent but also with very high lateral uniformity over 1"×1" substrates with a reasonably high growth rate of 500 nm/hour. Using these conditions YAG:Ce films were grown with 1-8 µm thickness range on SiC and c-Al$_2$O$_3$ substrates.

Scintillation Properties

FIGS. 3A-3E shows the photographs of the ~4 µm-thick YAG:Ce film sputter deposited on SiC and sapphire. FIGS. 3A, B show pictures of YAG:Ce (4 µm) grown by RF sputtering on SiC and sapphire substrates. The images show uniform phosphorescence under UV illumination and also high contact and non-contact transparency. These films exhibit very uniform phosphorescence under a UV source indicating uniform film growth. Photographed under visible lighting, films exhibit a high level of transparency in and out of contact to a background image (RMD logo in FIGS. 3C-3E).

Imaging Tests

Imaging tests on the YAG:Ce scintillating films were performed by exposing the scintillator to X-ray source operated at 28 kVp, 10 mAs. The scintillators were lens coupled to SCMOS camera with an effective pixel size of 30 µm or a Nyquist limiting frequency of 16 lp/mm.

The resulting data for a 2 µm thick YAG:Ce on c-Al$_2$O$_3$ is shown in FIGS. 4A-4C. The flood field X-ray image (4A) shows uniform response indicating thickness and stoichiometry uniformity of the film. The film is ~5% of the brightness of MinR_2000 mammography scintillator, which is a very good luminosity for a thin YAG:Ce film. FIG. 4B is an image of a tapered line-pair phantom indicating spatial resolution, significantly better than 5 lp/mm. FIG. 4C shows an image of a screw and a metallic washer, further confirming sharp imaging properties of the scintillator.

Other Imaging Results

Figures 5A, 5B, 5C:
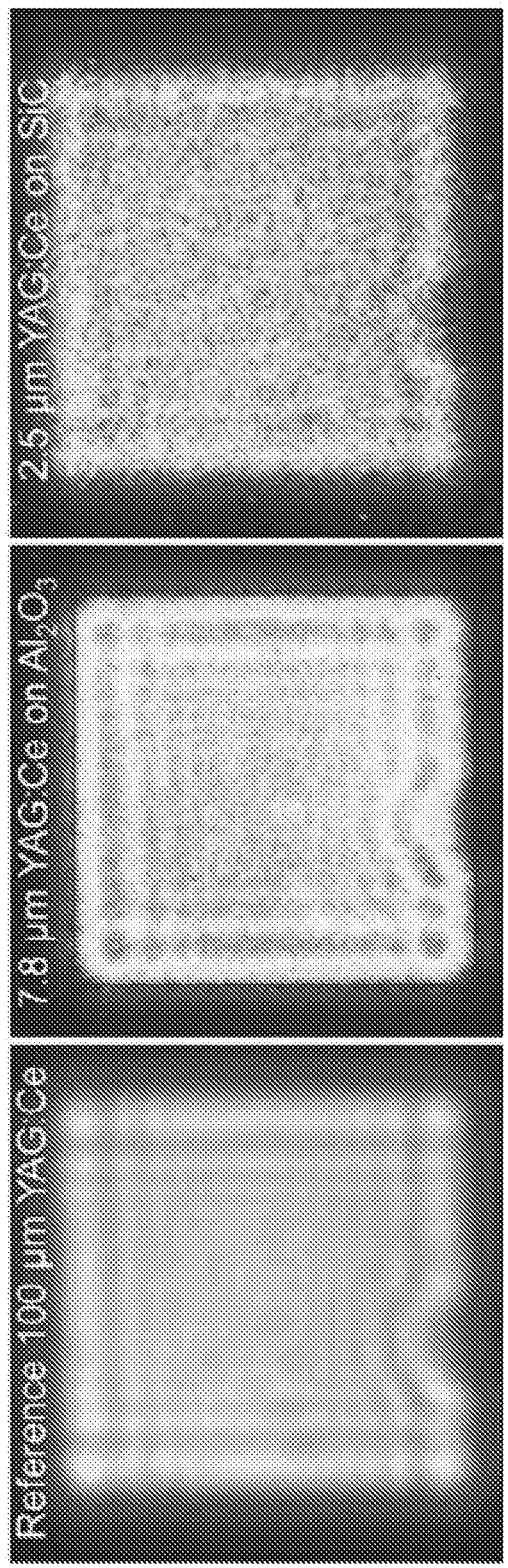

A standard image phantom measuring 0.5×0.5 mm in size was placed in front of the scintillator and was imaged by a lens coupled CCD sensor with very high spatial resolution. The scintillator was illuminated with 12 keV X-rays with beam aperture of 1 mm. Total 500 phantom images were acquired per scintillator specimen, each with a single XFEL pulse shot. The average of 500 shot images for representative scintillators are shown in FIGS. 5A-5C. FIGS. 5A-5C show Images of test phantom obtained at XFEL Beamline. (5A) 100 µm thick reference YAG:Ce scintillator, (5B) Sputter deposited 7.8 µm YAG:Ce on Al$_2$O$_3$, and (5C) 2.5 µm YAG:Ce on SiC.

As expected, reference scintillator (100 µm thick YAG:Ce crystal) efficiently absorbed 12 keV X-rays resulting in low image noise. Its resolution, however, is poor compared to the RMD 7.8 µm thick YAG:Ce. The thin YAG film is rather transparent to hard X-rays, which explains higher noise level in the image. But as can be seen from the image, this scintillator clearly resolved 5 µm line spacing features in the image implying the spatial resolution of at least 100 lp/mm.

The FEA of heat conduction in single pair, as in the illustrative instantiation above, serves as a starting FEA and can be extended to the stacked scintillators of these teachings, as those of FIGS. 2A and 2B.

Some of the detailed instantiations of these teachings make use of YAG:Ce scintillator because its performance is proven at cases such as FEL beamlines. It emits in yellow, which is well matched to the CCD quantum efficiency used in wavefront sensor, it is bright, and can provide very good spatial resolution in thin film form. Also, its high effective atomic number (Zeff) and high density permits efficient X-ray absorption. More importantly, this scintillator can be sputter deposited on suitable substrates such as the high thermal conductivity, transparent, sapphire or SiC that have specific advantages outlined below.

The choice of AlN and BeO as high k dielectric serves multiple purposes. Besides having high k, both these materials are transparent to YAG:Ce emission, which is centered around 540 nm, and have refractive indices comparable to that of YAG:Ce. This latter property is important to minimize the index mismatch within LYAG layers, which in turn minimizes light scatter and image blurring. Also, just like YAG:Ce, both AlN and BeO can be sputter deposited to form a thin film with very good crystallinity due to lattice match with substrates such as sapphire.

While illustrative instantiations have been presented to elucidate these teachings, it should be noted that these teachings include other instantiations. The scintillator material used in these teachings can include at least one of LuAG (Lutetium aluminum garnet) or Lu$_2$O$_3$.

In one or more instantiation, the method of these teachings for preventing thermal damage of a scintillator exposed to high energy, fast timing radiation beams includes depositing a layer of scintillator material on a first layer of a material with thermal conductivity greater than a predetermined thermal conductivity and selecting a thickness of the first layer from estimation of temperature distribution formed by a predetermined radial vacuum depositing a layer of scintillator material on a first layer of a material with thermal conductivity greater than a predetermined thermal conductivity, and selecting a thickness of said first layer from estimation of temperature distribution formed by a predetermined radiation pulse impinging on a layer of Scintillator material most distant from the first layer, the predetermined thermal conductivity being selected from the estimation of temperature such as to prevent thermal damage of the scintillator. Thermal conduction into the first layer prevents thermal damage of the scintillator.

As used herein, the singular forms "a," "an," and "the" include the plural reference unless the context clearly dictates otherwise. Except where otherwise indicated, all numbers expressing quantities of ingredients, reaction conditions, and so forth used in the specification and claims are to be understood as being modified in all instances by the term "about."

For the purpose of better describing and defining the present invention, it is noted that terms of degree (e.g., "substantially," "about," and the like) may be used in the specification and/or in the claims. Such terms of degree are utilized herein to represent the inherent degree of uncertainty that may be attributed to any quantitative comparison, value, measurement, and/or other representation. The terms of degree may also be utilized herein to represent the degree by which a quantitative representation may vary (e.g., ±10%) from a stated reference without resulting in a change in the basic function of the subject matter at issue.

What is claimed is:

1. A scintillator comprising:
a first layer of material with thermal conductivity greater than a predetermined thermal conductivity; and
a layer of scintillator material vacuum deposited on said first layer;
wherein a thickness of said first layer is obtained from estimations of temperature distribution, at various thicknesses of said first layer, formed by a predetermined radiation pulse impinging on a layer of scintillator material most distant from said first layer, in order to prevent thermal damage of the scintillator; the predetermined thermal conductivity being selected from the estimations of temperature, at various thermal conductivities, such as to obtain predetermined results, the predetermined results including thermal conduction that prevents thermal damage of the scintillator.

2. The scintillator of claim 1 wherein the predetermined thermal conductivity is between about 140 $Wm^{-1}K^{-1}$ and about 180 $Wm^{-1}K^{-1}$.

3. The scintillator of claim 1 wherein the first layer is a layer of one of AlN, BeO or SiC.

4. The scintillator of claim 1 wherein the first layer is vacuum deposited on a substrate.

5. The scintillator of claim 1 wherein the scintillator material comprises YAG:Ce.

6. The scintillator of claim 1 further comprising:
a second layer of a second material with thermal conductivity greater than 180 $Wm^{-1}K^{-1}$ deposited on said layer of Scintillator material; and
a second layer of Scintillator material vacuum deposited on said second layer of the second material;
wherein a thickness of said second layer is obtained from estimations, at various thicknesses of said second layer, of temperature distribution formed by an X-ray beam of energy between about 250 ev to about 18 kev impinging on the layer of Scintillator material most distant from said first layer, selected such as to prevent thermal damage of the scintillator.

7. The scintillator of claim 6 wherein the Scintillator material comprises YAG:Ce.

8. The scintillator of claim 6 wherein the second layer of material is a layer of one of AlN, BeO or SiC.

9. The scintillator of claim 6 wherein the second layer of material is vacuum deposited on a substrate.

10. The scintillator of claim 9 wherein the second layer of material is sputtered.

11. The scintillator of claim 1 wherein the scintillator material comprises at least one of LuAG or $Lu_2O_3$.

12. The scintillator of claim 1 wherein the predetermined radiation pulse comprises an X-ray beam of energy between about 250 ev to about 18 Kev and a repetition rate of up to about 1 Mhz.

13. A scintillator comprising a plurality of stacked components, each stacked component from the plurality of stacked components comprising:
a layer of material with thermal conductivity greater than a predetermined thermal conductivity; and
a layer of scintillator material vacuum deposited on said layer;
said each stacked component, starting with a second stacked component, being vacuum deposited on a preceding stacked component;
wherein a thickness of each layer of material is obtained from estimations of temperature distribution, at various thicknesses of said each layer, formed by a predetermined radiation pulse impinging on a layer of Scintillator material most distant from a layer of material in a first stacked component from the plurality of stacked components, selected such as to prevent thermal damage of the scintillator; the predetermined thermal conductivity being selected from the estimations of temperature, at various thermal conductivities, such as to obtain predetermined results, the predetermined results including thermal conduction that prevents thermal damage of the scintillator.

14. The scintillator of claim 13 wherein the Scintillator material comprises YAG:Ce.

15. The scintillator of claim 13 wherein said each layer of material is a layer of one of AlN, BeO or SiC.

16. The scintillator of claim 13 wherein a layer of material in a first stack is vacuum deposited on a substrate.

17. The scintillator of claim 16 wherein said each layer of material is sputtered.

18. The scintillator of claim 17 wherein the predetermined radiation pulse comprises an X-ray beam of energy between about 250 ev to about 18 Kev and a repetition rate of up to about 1 Mhz.

19. The scintillator of claim 13 wherein the Scintillator material comprises at least one of LuAG or $Lu_2O_3$.

20. A method for preventing thermal damage of a scintillator exposed to radiation due to energy, and fast timing of radiation beams, the method comprising:
depositing a first layer of scintillator material on a first layer of a material with thermal conductivity greater than a predetermined thermal conductivity; and
selecting a thickness of said first layer from estimations, at various thicknesses of said first layer, of temperature distribution formed by a predetermined radiation pulse impinging on a layer of scintillator material most distant from said first layer, wherein thermal conduction into said first layer prevents thermal damage of the scintillator; the predetermined thermal conductivity being selected from the estimations of temperature at various thermal conductivities, such as to prevent thermal damage of the scintillator.

21. The method of claim 20 further comprising:

vacuum depositing a second layer of material with thermal conductivity greater than the predetermined thermal conductivity on said first layer of scintillator material and vacuum depositing a second layer of scintillator material on the second layer of material with thermal conductivity greater than the predetermined thermal conductivity;

selecting a thickness of that second layer of material from estimations of temperature distribution, at various thicknesses of said second layer, formed by the predetermined radiation pulse impinging on a layer of scintillator material most distant from said first layer of material, wherein thermal conduction into said first layer of material and said second layer of material prevents thermal damage of the scintillator.

22. The method of claim 21 further comprising:

subsequently vacuum depositing a plurality of stacked components; each stacked component, starting from a second stacked component, being vacuum deposited on a preceding stacked component; a first stacked component being deposited on said second layer of scintillator material; each stacked component comprising:

a layer of material with thermal conductivity greater than the predetermined thermal conductivity and a layer of scintillator material vacuum deposited on said layer of material;

selecting a thickness of each layer of material from estimations, at various thicknesses of said each layer, of temperature distribution formed by a predetermined radiation pulse impinging on a layer of scintillator material most distant from a layer of material in a first stack component from the plurality of stacked components;

wherein thermal conduction into each said layer of material prevents thermal damage of the scintillator.

23. The method of claim 21 wherein the predetermined radiation pulse comprises an X-ray beam of energy between about 250 ev to about 18 Kev and a repetition rate of up to about 1 Mhz.

* * * * *